(12) United States Patent
Morishita et al.

(10) Patent No.: US 10,729,998 B2
(45) Date of Patent: Aug. 4, 2020

(54) OIL MIST SEPARATOR

(71) Applicant: TOYOTA BOSHOKU KABUSHIKI KAISHA, Aichi-ken (JP)

(72) Inventors: Hideto Morishita, Gifu-ken (JP); Yoji Horiuchi, Aichi-ken (JP); Naritsune Miyanaga, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 63 days.

(21) Appl. No.: 15/863,251

(22) Filed: Jan. 5, 2018

(65) Prior Publication Data

US 2018/0207565 A1 Jul. 26, 2018

(30) Foreign Application Priority Data

Jan. 25, 2017 (JP) ................... 2017-011494

(51) Int. Cl.
*B01D 47/00* (2006.01)
*B01D 45/08* (2006.01)
*F01M 13/04* (2006.01)
*B01D 46/00* (2006.01)

(52) U.S. Cl.
CPC ......... *B01D 45/08* (2013.01); *B01D 46/0089* (2013.01); *F01M 13/0405* (2013.01); *F01M 13/0416* (2013.01); *F01M 2013/0422* (2013.01); *F01M 2013/0438* (2013.01); *F01M 2013/0461* (2013.01)

(58) Field of Classification Search
CPC ...... B01D 45/08; B01D 46/003; F01M 13/04; F01M 2013/0072; F01M 2013/0433; F01M 2013/0438; F01M 13/0416
See application file for complete search history.

(56) References Cited

U.S. PATENT DOCUMENTS 4,569,323 A * 2/1986 Okumura ........... F01M 13/0416
123/41.86
4,602,595 A * 7/1986 Aoki .................. F01M 13/0416
123/41.86

(Continued)

FOREIGN PATENT DOCUMENTS

EP 3034823 A1 6/2016
EP 3034823 B1 2/2019

(Continued)

OTHER PUBLICATIONS

Office Action issued in Japan Counterpart Patent Appl. No. 2017-011494, dated Jun. 23, 2020, along with an English translation thereof.

*Primary Examiner* — Dung H Bui

(74) *Attorney, Agent, or Firm* — Greenblum & Bernstein, P.L.C.

(57) ABSTRACT

The oil mist separator separates oil from blow-by gas which flows through a gas flow passage. A chamber, which is partitioned from the gas flow passage including a gas introduction port, is provided between a cylinder head cover and a baffle plate. A first guide wall, which extends with a downward inclination toward the chamber so as to cover the gas introduction port and the chamber, is provided above the gas introduction port and the chamber. A drain hole for discharging the oil within the chamber is formed in the baffle plate.

7 Claims, 6 Drawing Sheets

(56) References Cited

U.S. PATENT DOCUMENTS

| | | | | |
|---|---|---|---|---|
| 4,627,406 A * | 12/1986 | Namiki | F01M 13/04 123/572 |
| 4,723,529 A * | 2/1988 | Yokoi | F01M 13/0416 123/41.86 |
| 7,080,636 B2 * | 7/2006 | Knaus | F01M 13/022 123/572 |
| 9,463,403 B2 * | 10/2016 | Wakabayashi | B01D 45/08 |
| 2005/0092267 A1 | 5/2005 | Nonaka et al. | |
| 2009/0250044 A1 * | 10/2009 | Braun | B01D 45/06 123/573 |
| 2010/0006075 A1 * | 1/2010 | Ruppel | F01M 13/023 123/573 |
| 2011/0179755 A1 * | 7/2011 | Gruhler | B29C 65/58 55/320 |
| 2011/0290225 A1 * | 12/2011 | Torella | F01M 13/022 123/573 |
| 2011/0314779 A1 * | 12/2011 | Sakaguchi | F01M 13/0416 55/464 |
| 2013/0276767 A1 * | 10/2013 | Polichetti | F01M 13/04 123/573 |
| 2014/0109533 A1 * | 4/2014 | Horiuchi | F01M 13/04 55/430 |
| 2014/0165512 A1 * | 6/2014 | Horiuchi | F01M 13/04 55/322 |
| 2014/0182568 A1 * | 7/2014 | Hwang | F01M 13/04 123/572 |
| 2015/0337698 A1 * | 11/2015 | Ruppel | F01M 13/04 123/41.86 |
| 2016/0177792 A1 | 6/2016 | Hayashi et al. | |
| 2016/0333753 A1 * | 11/2016 | Nawa | F02F 7/006 |

FOREIGN PATENT DOCUMENTS

| | | | | |
|---|---|---|---|---|
| JP | 2005-120855 | | 5/2005 | |
| JP | 2009121281 A | * | 6/2009 | F01M 13/04 |
| JP | 2009-174385 | | 8/2009 | |
| JP | 2010248935 A | * | 11/2010 | F01M 13/04 |
| JP | 2013053523 A | * | 3/2013 | F01M 13/04 |
| JP | 2014092036 A | * | 5/2014 | F01M 13/0416 |
| JP | 2016-114034 | | 6/2016 | |
| JP | 2016-114038 | | 6/2016 | |

* cited by examiner

OIL MIST SEPARATOR

CROSS-REFERENCE TO RELATED APPLICATIONS

The present application claims priority under 35 U.S.C. § 119 of Japanese Application No. 2017-011494 filed on Jan. 25, 2017, the disclosure of which is expressly incorporated by reference herein in its entirety.

BACKGROUND

1. Technical Field

The present invention relates to an oil mist separator, and, more specifically, to an oil mist separator which separates oil from blow-by which flows through a gas flow passage formed between a cylinder head cover and a baffle plate.

2. Related Art

As a conventional oil mist separator, there is generally known an oil mist separator including a cylinder head cover, a baffle plate that closes the bottom surface side of the cylinder head cover, and a gas flow passage formed between the cylinder head cover and the baffle plate, the oil mist separator separating oil from blow-by gas which flows from a gas introduction port formed in the baffle plate into the gas flow passage and flows through the gas flow passage (for example, see JP 2005-120855 A and JP 2016-114038 A). JP 2005-120855 A discloses a technique in which a plurality of protrusions (protrusions 41; see FIG. 2 and the like of JP 2005-120855 A) are provided in a portion opposed to a gas introduction port on a ceiling wall of a cylinder head cover to collect scattered oil splashed by rotation of a cam shaft and the collected oil is returned to the side of a cam chamber directly below the gas introduction port. JP 2016-114038 A discloses a technique in which a shielding plate (shielding plate 15; see FIG. 3 and the like of JP 2016-114038 A) is provided on the outer side of a gas introduction port to shield scattered oil splashed by rotation of a cam shaft and the collected oil is returned to the side of a cam chamber directly below a gas introduction port.

In the techniques disclosed in JP 2005-120855 A and JP 2016-114038 A indicated above, however, the oil collected by the protrusions or shielding plate is returned to the side of the cam chamber directly below the gas introduction port. Thus, the returned oil collides with the scattered oil splashed by rotation of the cam shaft, so that the scattered oil is easily re-carried away. Or, the returned oil is easily re-carried away by the flow of blow-by gas having a high flow velocity. As a result of this, the oil separation efficiency is reduced. Further, in the technique disclosed in JP 2016-114038 A indicated above, the shielding plate is arranged in a state where it is projected to the side of the cam chamber directly below the gas introduction port, and thus a space for installing the shielding plate is needed. Or, the place for installing the shielding plate is limited.

SUMMARY

Embodiments of the present invention have been made in light of the current situation described above, and an object thereof is to provide an oil mist separator with excellent installation properties, which discharges scattered oil flowing into a gas flow passage to the side of a cam chamber, at a position distant from directly below the gas introduction port, thereby making it possible to improve the oil separation efficiency.

One aspect of the present embodiments provides an oil mist separator including: a cylinder head cover; a baffle plate which closes the bottom surface side of the cylinder head cover; and a gas flow passage formed between the cylinder head cover and the baffle plate, the oil mist separator separating oil from blow-by gas which flows from a gas introduction port formed in the baffle plate into the gas flow passage and flows through the gas flow passage, wherein a chamber is provided between the cylinder head cover and the baffle plate, the chamber being partitioned from the gas flow passage including the gas introduction port, wherein a first guide wall is provided above the gas introduction port and the chamber, the first guide wall extending with a downward inclination toward the chamber so as to cover the gas introduction port and the chamber, and wherein a drain hole for discharging the oil within the chamber is formed in the baffle plate.

In a further aspect, the first guide wall may be composed of a part of a ceiling wall of the cylinder head cover.

In a further aspect, a second guide wall may be provided between the first guide wall and the gas introduction port, the second guide wall extending with a downward inclination toward the chamber, and the second guide wall may be provided with a passing part through which scattered oil flowing from the gas introduction port into the gas flow passage can pass.

In a further aspect, a rib may be raised along the outer peripheral side of the passing part on the upper surface of the second guide wall.

In a further aspect, the passing part may be composed of an opening part.

In a further aspect, the passing part may be composed of a mesh-like material or composed of a porous plate having a plurality of through holes formed therein.

In a further aspect, the first guide wall may be formed in a dome roof or gable roof-like shape which inclines toward the left and right edge sides of the second guide wall.

In a further aspect, the chamber and the gas flow passage may be partitioned by a partition wall raised from on the baffle plate.

In a further aspect, the partition wall may be arranged along an edge side of the gas introduction port.

According to the oil mist separator of this embodiment, a chamber which is partitioned from the gas flow passage including the gas introduction port is provided between the cylinder head cover and the baffle plate; a first guide wall which extends with a downward inclination toward the chamber so as to cover the gas introduction port and the chamber is provided above the gas introduction port and the chamber; and a drain hole for discharging the oil within the chamber is formed in the baffle plate. Thus, the scattered oil flowing from the gas introduction port into the gas flow passage, in the scattered oil splashed by rotation of the cam shaft, collides with the first guide wall, and is transmitted along the first guide wall and introduced into the chamber. The oil within the chamber is discharged through the drain hole to the cam chamber side, at a position distant from directly below the gas introduction port. Accordingly, the oil discharged to the cam chamber side is hard to be re-carried away due to the collision with the scattered oil by rotation of the cam shaft or the flow of blow-by gas having a high flow velocity, thereby making it possible to improve the oil separation efficiency. Further, it is unnecessary to provide a shielding plate on the outer side of the gas introduction port as conventional, and excellent installation properties are obtained.

When the first guide wall is composed of a part of a ceiling wall of the cylinder head cover, a simple and small structure can be attained.

When a second guide wall is provided between the first guide wall and the gas introduction port, and the second guide wall is provided with a passing part, the scattered oil flowing from the gas introduction port into the gas flow passage, in the scattered oil splashed by rotation of the cam shaft, passes through the passing part provided in the second guide wall, collides with the first guide wall, and is transmitted along the first guide wall and introduced into the chamber, and transmitted from the first guide wall onto the second guide wall, guided on the second guide wall and introduced into the chamber. Accordingly, the scattered oil flowing from the gas introduction port into the gas flow passage can be more reliably returned to the cam chamber side.

When a rib is raised on the upper surface of the second guide wall, the oil guided on the second guide wall is inhibited from dropping down via the passing part to the gas introduction port by the rib.

When the passing part is composed of an opening part, the passing properties of the scattered oil through the passing part are enhanced.

When the passing part is composed of a mesh-like material or composed of a porous plate, the scattered oil colliding with the first guide wall to be aggregated, when dropping down, is easily transmitted on the passing part and introduced into the chamber.

Further, when the first guide wall is formed in a dome roof or gable roof-like shape, the oil colliding with the first guide wall is effectively introduced from the first guide wall onto the second guide wall.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 10A and 10B include explanatory views for explaining an oil mist separator according to another form, in which FIG. 10A shows a form including a first guide wall which is different from a cylinder head cover, and FIG. 10B shows a form including no second guide wall.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

<Oil Mist Separator>

Figure 1:
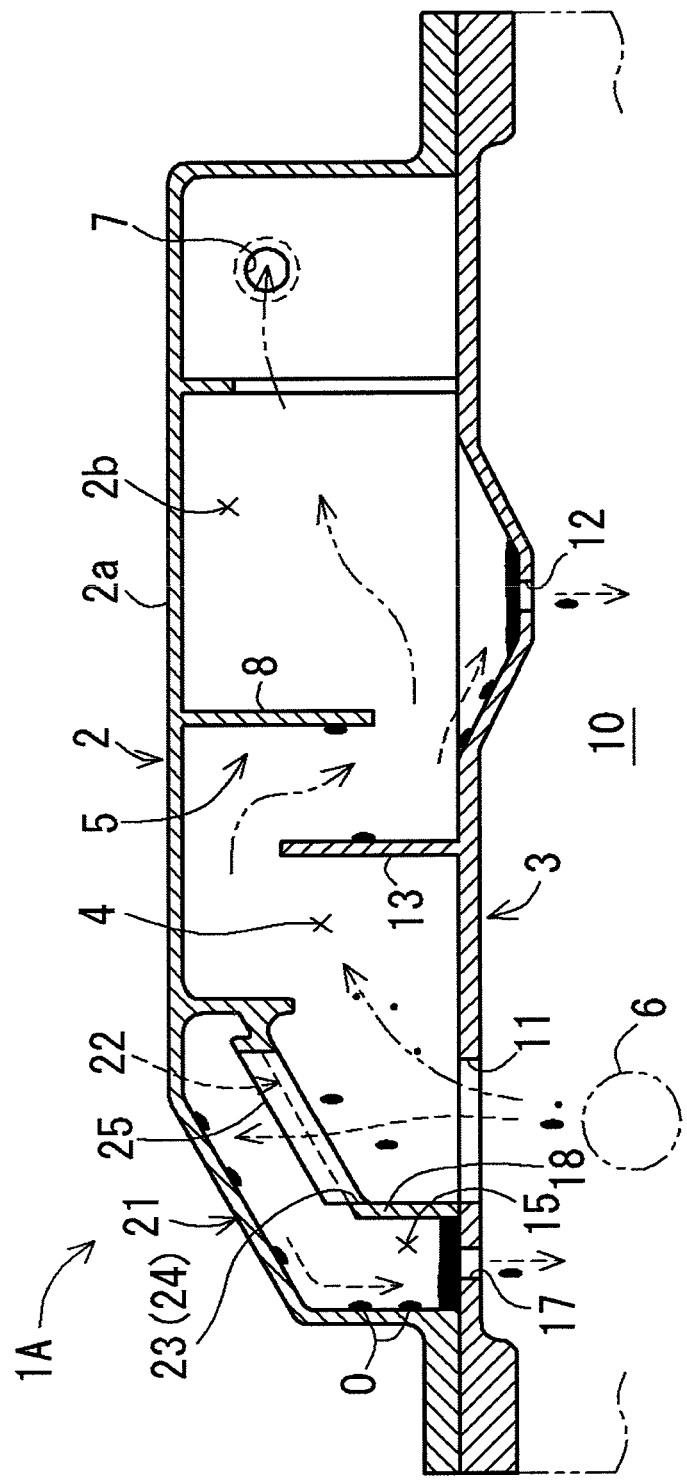
FIG. 1 is a longitudinal sectional view of an oil mist separator according to Example 1.

An oil mist separator according to this embodiment is an oil mist separator (1A, 1B, 1C) including: a cylinder head cover (2); a baffle plate (3) which closes the bottom surface side of the cylinder head cover; and a gas flow passage (4) formed between the cylinder head cover and the baffle plate, the oil mist separator separating oil from blow-by gas which flows from a gas introduction port (11) formed in the baffle plate (3) into the gas flow passage (4) and flows through the gas flow passage (for example, see FIG. 1). A chamber (15), which is partitioned from the gas flow passage (4) including the gas introduction port (11), is provided between the cylinder head cover (2) and the baffle plate (3). A first guide wall (21, 21', 21"), which extends with a downward inclination toward the chamber so as to cover the gas introduction port (11) and the chamber (15), is provided above the gas introduction port and the chamber. A drain hole (17) for discharging the oil within the chamber (15) is formed in the baffle plate (3) (for example, see FIGS. 2 to 5).

Figure 2:
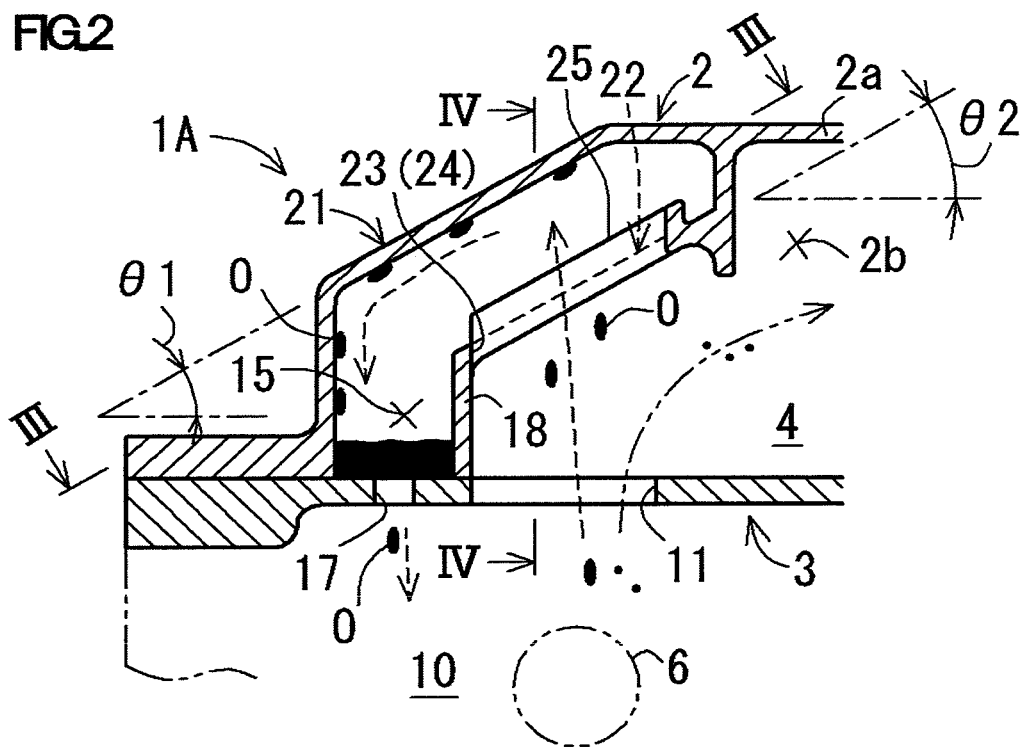
FIG. 2 is an enlarged view of essential parts shown in FIG. 1.
Figure 3:
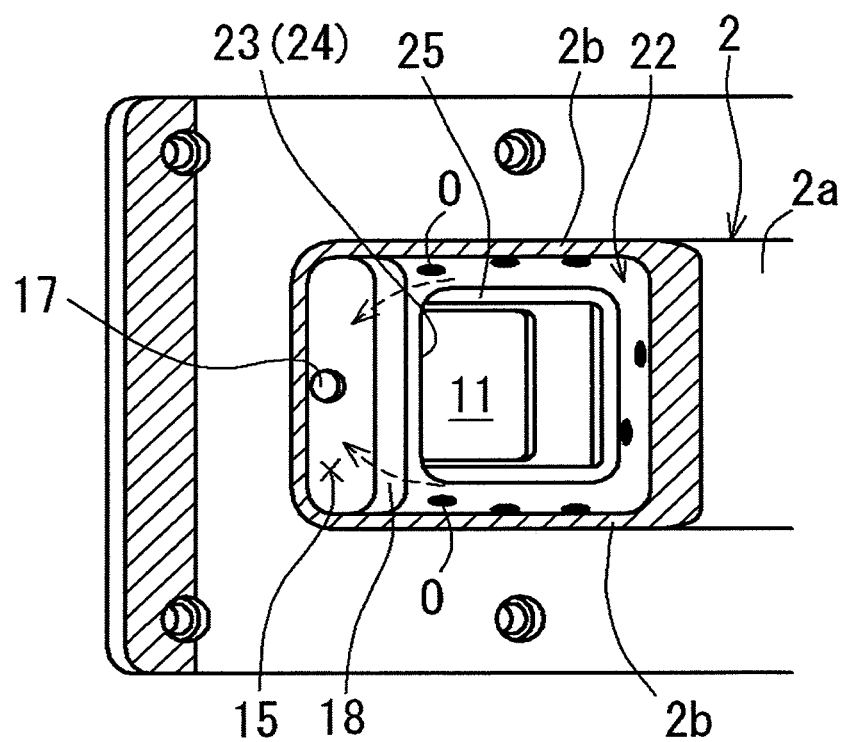
FIG. 3 is a cross-sectional view along line of FIG. 2.
Figure 4:
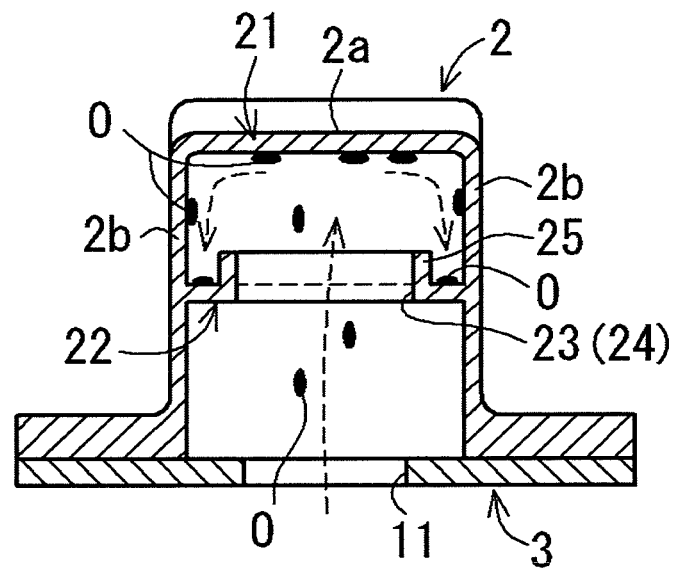
FIG. 4 is a cross-sectional view along line IV-IV of FIG. 2.

Examples of an inclination angle (θ1) of the first guide wall (21, 21', 21") to a planar direction of the baffle plate (3) include 15 to 75 degrees (preferably 30 to 60 degrees) (for example, see FIG. 2). Any shapes, materials and the like of the cylinder head cover (2) and baffle plate (3) described above may be used.

Examples of the oil mist separator according to this embodiment can include a form in which the first guide wall (21, 21') is composed of a part of a ceiling wall (2*a*) of the cylinder head cover (for example, see FIG. 2).

Examples of the oil mist separator according to this embodiment can include a form in which a second guide wall (22, 22') which extends with a downward inclination toward the chamber (15) is provided between the first guide wall (21, 21', 21") and the gas introduction port (11) and the second guide wall (22, 22') is provided with a passing part (23, 23') through which scattered oil flowing from the gas introduction port (11) into the gas flow passage (4) can pass (for example, see FIG. 2).

Examples of an inclination angle (θ2) of the second guide wall (22, 22') to the planar direction of the baffle plate (3) include 15 to 75 degrees (preferably 30 to 60 degrees) (for example, see FIG. 2).

Figure 5:
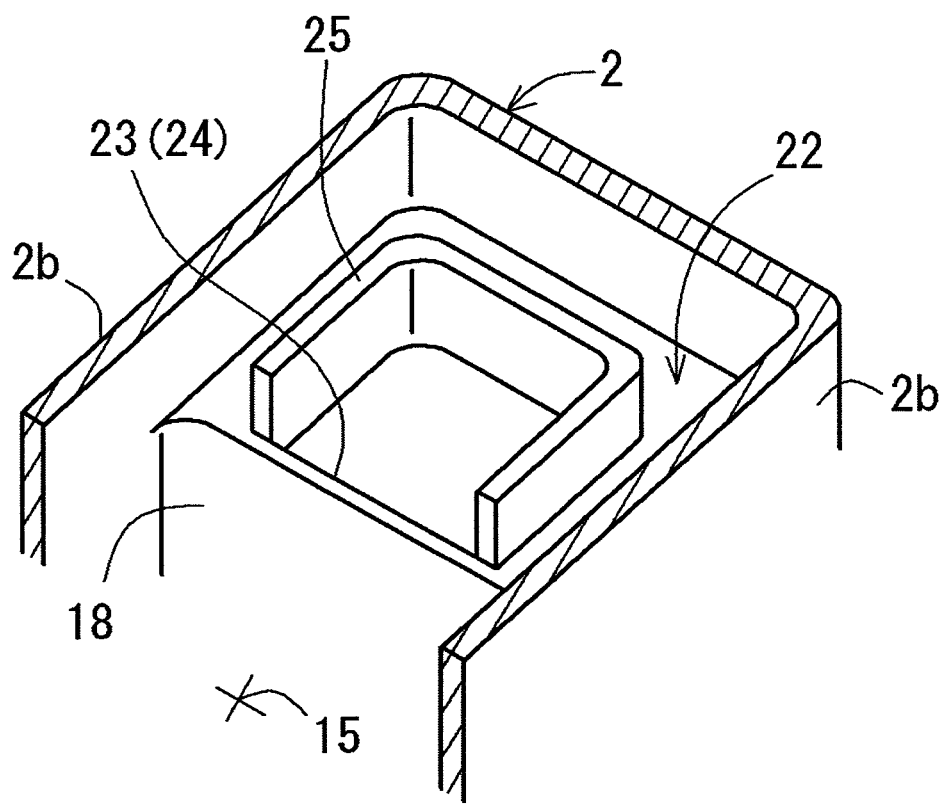
FIG. 5 is an explanatory view for explaining a second guide wall according to the Example.

In the case of the forms described above, for example, a rib (25) can be raised along the outer periphery side of the passing part (23) on the upper surface of the second guide wall (22) (for example, see FIG. 5).

In the case of the forms described above, for example, the passing part (23) can be composed of an opening part (24) (for example, see FIG. 5). Further, for example, the passing part (23') can be composed of a mesh-like material (34) or can be composed of a porous plate (36) having a plurality of through holes (35) formed therein (for example, see FIGS. 6 and 7).

Any material, mesh size and the like of the mesh-like material (34) may be used. Examples of the opening area of a single mesh of this mesh-like material include 0.5 to 10 mm$^2$ (especially, 1 to 5 mm$^2$). Any material, through hole size and the like of the porous plate (36) may be used. Examples of the opening area of a single through hole (35) of this porous plate include 0.5 to 10 mm$^2$ (especially, 1 to 5 mm$^2$).

Figure 9:
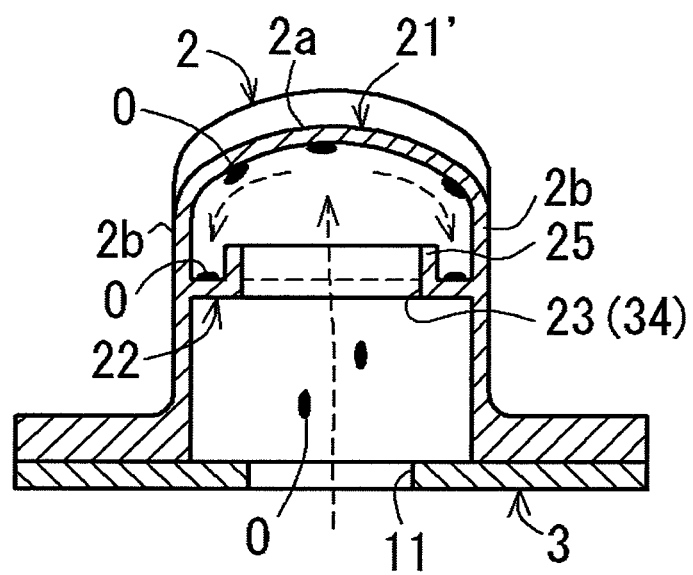
FIG. 9 is a longitudinal sectional view of essential parts of an oil mist separator according to Example 3.

In the case of the forms described above, for example, the first guide wall (21') can be formed in a dome roof or gable roof-like shape which inclines toward the left and right edge sides of the second guide wall (22) (for example, see FIG. 9). Meanwhile, the "dome roof-like" shape described above includes a round roof-like shape as well as an arch roof-like shape.

Examples of the oil mist separator according to this embodiment can include a form in which the chamber (15) and the gas flow passage (4) are partitioned by a partition wall (18) raised from on the baffle plate (3) (for example, see FIG. 2). By virtue of this configuration, a simple and small structure can be obtained. In this case, the partition wall is preferably arranged along an edge side of the gas introduction port.

The parenthesized reference numerals of various elements in the embodiments described above indicate the corresponding relationships with specific elements mentioned in Examples which will be described later.

EXAMPLES

Hereinafter, the present invention will be explained in detail through description of Examples with reference to the drawings.

Example 1

(1) Configuration of Oil Mist Separator

An oil mist separator 1A according to this Example separates oil from blow-by gas which flows through a gas flow passage 4 that is formed between a cylinder head cover 2 and a baffle plate 3, as shown in FIG. 1. This oil mist separator 1A has a labyrinth type gas-liquid separation structure 5 arranged within the gas flow passage 4.

The cylinder head cover 2 described above is made of a resin, and formed in a box-like shape with the bottom surface side open. This cylinder head cover 2 includes a ceiling wall 2a and a side wall 2b extending downward from the outer peripheral side of the ceiling wall 2a. Also, the cylinder head cover 2 has formed therein a gas exhaust port 7 which discharges the blow-by gas after oil separation to the outside. This gas exhaust port 7 is arranged on the downstream side of the gas-liquid separation structure 5 in the gas flow passage 4. Further, the cylinder head cover 2 is provided with an upper baffle 8 which constitutes the gas-liquid separation structure 5.

The baffle plate 3 described above is made of a resin, and formed in a flat plate shape. This baffle plate 3 is joined, by welding, adhesion or the like, to the cylinder head cover 2 so as to close the bottom surface side thereof, and a gas flow passage 4 is formed therebetween. Also, the baffle plate 3 has formed therein a gas introduction port 11 which allows the blow-by gas generated in an engine to flow into the gas flow passage 4. This gas introduction port 11 is arranged on the most upstream side of the gas flow passage 4. Also, the baffle plate 3 has formed therein a drain hole 12 for discharging the oil separated by the gas-liquid separation structure 5 to the side of a cam chamber 10. This drain hole 12 is arranged on the downstream side of the gas-liquid separation structure 5 in the gas flow passage 4. Further, the baffle plate 3 is provided with a lower baffle 13 which constitutes the gas-liquid separation structure 5.

A chamber 15, which is partitioned from the gas flow passage 4 including the gas introduction port 11 as shown in FIGS. 2 to 5, is provided between the cylinder head cover 2 and the baffle plate 3. This chamber 15 is partitioned, in a planar direction of the baffle plate 3, from the gas flow passage 4 by a partition wall 18 raised from on the baffle plate 3. The lower end side in an inclination direction of a second guide wall 22 which will be described later is connected to the upper end side of this partition wall 18. Further, the left and right edge sides of the partition wall 18 are connected to side walls 2b of the cylinder head cover 2. Further, the oil introduced by the first guide wall 21 and the second guide wall 22 which will be described later is stored in the chamber 15 in order to prevent the backflow of the oil, thereby establishing an oil head (see FIG. 2). Furthermore, the baffle plate 3 has formed therein a drain hole 17 for discharging the oil stored within the chamber 15 to the side of the cam chamber 10.

Above the gas introduction port 11 and the chamber 15, there is provided the first guide wall 21 which extends with a downward inclination toward the chamber 15 so as to cover the gas introduction port 11 and the chamber 15. This first guide wall 21 is composed of a part of the ceiling wall 2a of the cylinder head cover 2. The first guide wall 21 is formed in a flat plate shape. The inclination angle θ1 of the first guide wall 21 to the planar direction of the baffle plate 3 is defined as about 30 degrees (see FIG. 2).

Between the first guide wall 21 and the gas introduction port 11, there is provided the second guide wall 22 which extends with a downward inclination toward the chamber 15. This second guide wall 22 extends substantially in parallel with the first guide wall 21. In other words, the inclination angle θ2 of the second guide wall 22 to the planar direction of the baffle plate 3 is defined as about 30 degrees (see FIG. 2). Also, the second guide wall 22 is provided with a passing part 23 through which scattered oil flowing from the gas introduction port 11 into the gas flow passage 4 can pass. This passing part 23 is composed of an opening part 24. On the upper surface of the second guide wall 22, a rib 25 is raised along the outer peripheral side of the passing part 23. Specifically, the rib 25 is arranged in a position except the lower end side in the inclination direction on the whole outer peripheral side of the passing part 23 (see FIG. 3). In brief, the rib 25 is formed in an almost U-shape in plan view. Also, the upper end side, in the inclination direction, of the second guide wall 22 is connected to the ceiling wall 2a while it is bent (or curved) toward the ceiling wall 2a of the cylinder head cover 2.

(2) Operation of Oil Mist Separator

Next, the operation of the oil mist separator 1A configured as described above will be explained. The blow-by gas generated in an engine is introduced from the gas introduction port 11 into the gas flow passage 4, by the action of the negative pressure of an intake system or the like, as shown by virtual line arrows in FIG. 1. This blow-by gas contains, for example, relatively small drops of liquid oil in the scattered oil splashed by rotation of the cam shaft 6. The blow-by gas which flows through the gas flow passage 4 collides with each of the baffles 8 and 13, so that oil is separated therefrom. The blow-by gas after oil separation is sent via the gas exhaust port 7 to the intake system. The oil separated and collected by each of the baffles 8 and 13 is discharged through the drain hole 12 to the side of the cam chamber 10.

On the other hand, scattered oil O flowing from the gas introduction port 11 into the gas flow passage 4, as shown by a dashed line arrow in FIG. 2, in the scattered oil O (relatively large drops of liquid oil) splashed by rotation of the cam shaft 6, passes through the passing part 23 of the second guide wall 22 and collides with the first guide wall 21. The oil O colliding with the first guide wall 21 is transmitted along the first guide wall 21 and introduced into the chamber 15, and transmitted from the first guide wall 21 along the side walls 2b of the cylinder head cover 2, guided on the second guide wall 22, and introduced into the chamber 15 (see FIG. 4). The oil O guided on the second guide wall 22 is inhibited from dropping downward via the passing part 23 by the rib 25. The oil O stored within the chamber 15 is discharged through the drain hole 17 to the side of the cam chamber 10, at a position distant from directly below the gas introduction port 11.

(3) Effect of Example

According to the oil mist separator 1A of this Example, the chamber 15 which is partitioned from the gas flow passage 4 including the gas introduction port 11 is provided between the cylinder head cover 2 and the baffle plate 3; the first guide wall 21 which extends with a downward inclination toward the chamber 15 so as to cover the gas introduction port 11 and the chamber 15 is provided above the gas introduction port 11 and the chamber 15; and the drain hole 17 for discharging the oil within the chamber 15 is formed in the baffle plate 3. Thus, the scattered oil flowing from the gas introduction port 11 into the gas flow passage 4, in the scattered oil splashed by rotation of the cam shaft 6, collides with the first guide wall 21, and is transmitted along the first guide wall 21 and introduced into the chamber 15. Then, the oil within the chamber 15 is discharged through the drain hole 17 to the side of the cam chamber 10, at a position distant from directly below the gas introduction port 11. Accordingly, the oil discharged to the side of the cam chamber 10 is hard to be re-carried away due to collision with the scattered oil by rotation of the cam shaft 6 or the flow of blow-by gas having a high flow velocity, thereby making it possible to improve the oil separation efficiency. Further, it is unnecessary to provide a shielding plate on the outer side of the gas introduction port 11 as conventional, and excellent installation properties are obtained.

In this Example, the first guide wall 21 is composed of a part of the ceiling wall 2a of the cylinder head cover 2. Thus, a simple and small structure can be attained.

In this Example, the second guide wall 22 is provided between the first guide wall 21 and the gas introduction port 11, and the second guide wall 22 is provided with the passing part 23. Thus, the scattered oil flowing from the gas introduction port 11 into the gas flow passage 4, in the scattered oil splashed by rotation of the cam shaft 6, passes through the passing part 23 of the second guide wall 22, collides with the first guide wall 21, and is transmitted along the first guide wall 21 and introduced into the chamber 15, and transmitted from the first guide wall 21 onto the second guide wall 22, guided on the second guide wall 22, and introduced into the chamber 15. Accordingly, the scattered oil flowing from the gas introduction port 11 into the gas flow passage 4 can be more reliably returned to the side of the cam chamber 10.

In this Example, the rib 25 is raised on the upper surface of the second guide wall 22. Thus, the oil guided on the second guide wall 22 is inhibited from dropping down via the passing part 23 to the gas introduction port 11 by the rib 25. In this Example, the passing part 23 is composed of the opening part 24. Thus, the passing properties of the scattered oil through the passing part 23 are enhanced.

Further, in this Example, the chamber 15 and the gas flow passage 4 are partitioned by the partition wall 18 raised from an edge side of the gas introduction port 11 on the baffle plate 3. Thus, the chamber 15 and the gas flow passage 4 are arranged adjacent to each other, thereby making it possible to realize a simple and small structure.

Example 2

Next, an oil mist separator 1B according to Example 2 will be explained. Constituent elements of the oil mist separator 1B according to Example 2 that are substantially the same as those of the oil mist separator 1A according to Example 1 described above are given the same reference numerals and will not be described again in detail.

(1) Configuration of Oil Mist Separator

Figure 6:
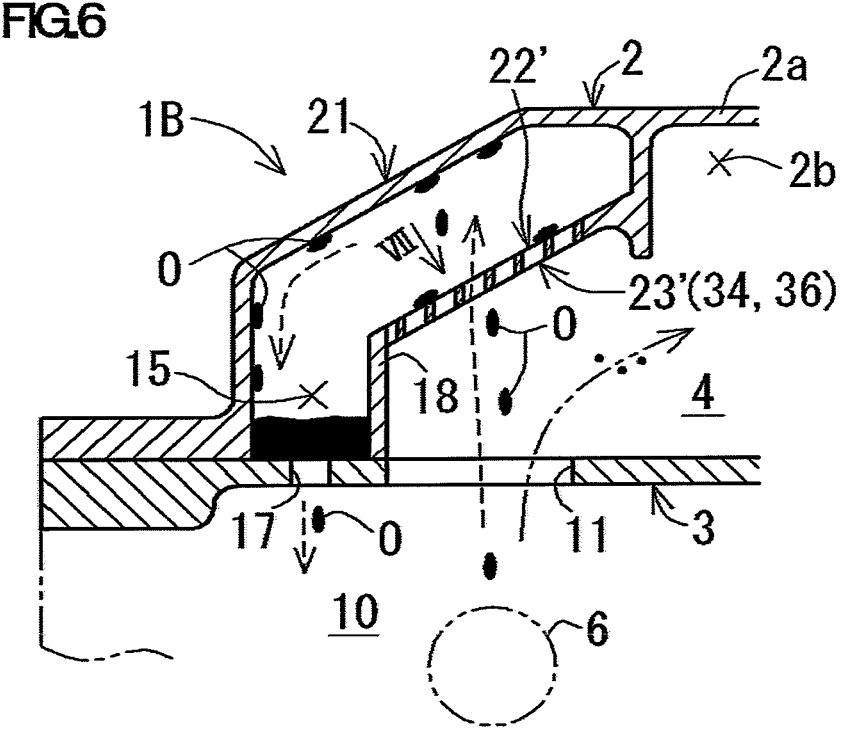
FIG. 6 is a longitudinal sectional view of essential parts of an oil mist separator according to Example 2.
Figure 7:
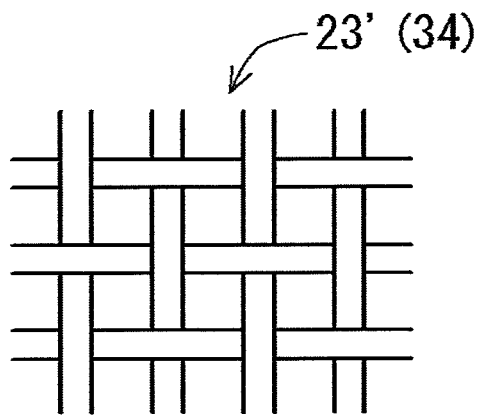
FIGS. 7(*a*) and 7(*b*) include enlarged views of a part indicated by an arrow of line VII of FIG. 6, in which FIG. 7(*a*) shows a form in which a passing part is composed of a mesh-like material, and FIG. 7(*b*) shows a form in which the passing part is composed of a porous plate.
Figure 7:
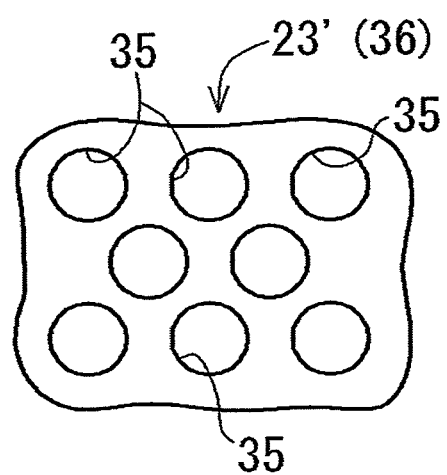

The oil mist separator 1B according to this Example includes a first guide wall 21 and a second guide wall 22' as shown in FIGS. 6 and 7. This second guide wall 22' is provided with a passing part 23' through which scattered oil flowing from a gas introduction port 11 into a gas flow passage 4 can pass. This passing part 23' is composed of a mesh-like material 34 such as a metal mesh (see FIG. 7(a)), or composed of a porous plate 36 having a plurality of through holes 35 formed therein (see FIG. 7(b)).

The opening area of the meshes of the mesh-like material 34 or the opening area of the through holes 35 formed in the porous plate 36 is set to a value such that the scattered oil flowing from the gas introduction port 11 into the gas flow passage 4 easily passes through the openings and that the scattered oil colliding with the first guide wall 21 to be aggregated, when dropping down, is hard to pass through the openings.

(2) Operation and Effect of Oil Mist Separator

The oil mist separator 1B according to this Example 2 operates in substantially the same manner and provides substantially the same effects as the oil mist separator 1A according to Example 1 described above, and the passing part 23' is composed of the mesh-like material 34 or composed of the porous plate 36 having the plurality of through holes 35 formed therein. Thus, the scattered oil O colliding with the first guide wall 21 to be aggregated, when dropping down, is easily transmitted on the passing part 23' and introduced into the chamber 15.

Figure 8:
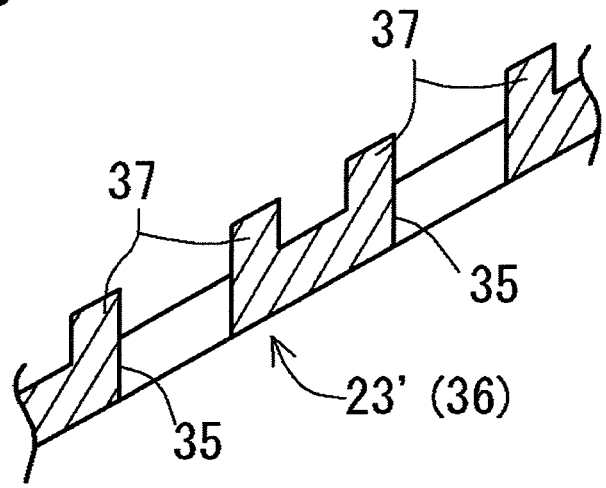
FIG. 8 is an explanatory view for explaining a variant of the porous plate mentioned above.

When the porous plate 36 described above is adopted, it is preferred to provide return ribs 37 in positions enclosing the through holes 35 on the upper surface of the porous plate 36, as shown in FIG. 8. This is because the return ribs 37 inhibit the oil transmitted on the porous plate 36 from dropping down via the through holes 35 to the gas introduction port 11.

Example 3

Next, an oil mist separator 1C according to Example 3 will be explained. Constituent elements of the oil mist separator 1C according to Example 3 that are substantially the same as those of the oil mist separator 1A according to Example 1 described above are given the same reference numerals and will not be described again in detail.

(1) Configuration of Oil Mist Separator

The oil mist separator 1C according to this Example includes a first guide wall 21' and a second guide wall 22 as shown in FIG. 9. This first guide wall 21' is formed in a dome roof-like shape such that it inclines toward the left and right edge sides of the second guide wall 22 (namely, left and right edge sides in a direction orthogonal to the inclination direction of the second guide wall 22).

(2) Operation and Effect of Oil Mist Separator

The oil mist separator 1C according to this Example 3 operates in substantially the same manner and provides substantially the same effects as the oil mist separator 1A according to Example 1 described above, and the first guide wall 21' is formed in a dome roof-like shape. Thus, the scattered oil colliding with the first guide wall 21' is effectively introduced from the first guide wall 21' onto the second guide wall 22.

Figure 10A:
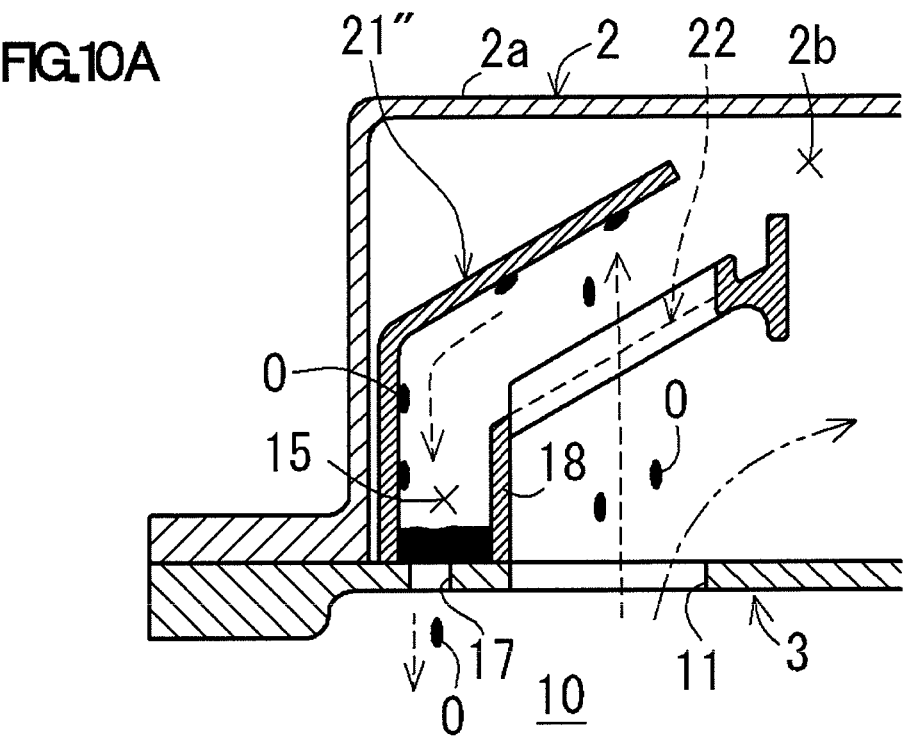

The present invention is not limited to the Examples described above and may be embodied with various changes made within the scope of the present invention in accordance with the purposes and applications. While the first guide walls 21, 21' which are each composed of a part of the ceiling wall 2a of the cylinder head cover 2 have been exemplified in the Examples described above, the present invention is not limited thereto. For example, a first guide wall 21" which is arranged within the cylinder head cover 2 and is different from the cylinder head cover 2, as shown in FIG. 10A, may be employed.

Figure 10B:
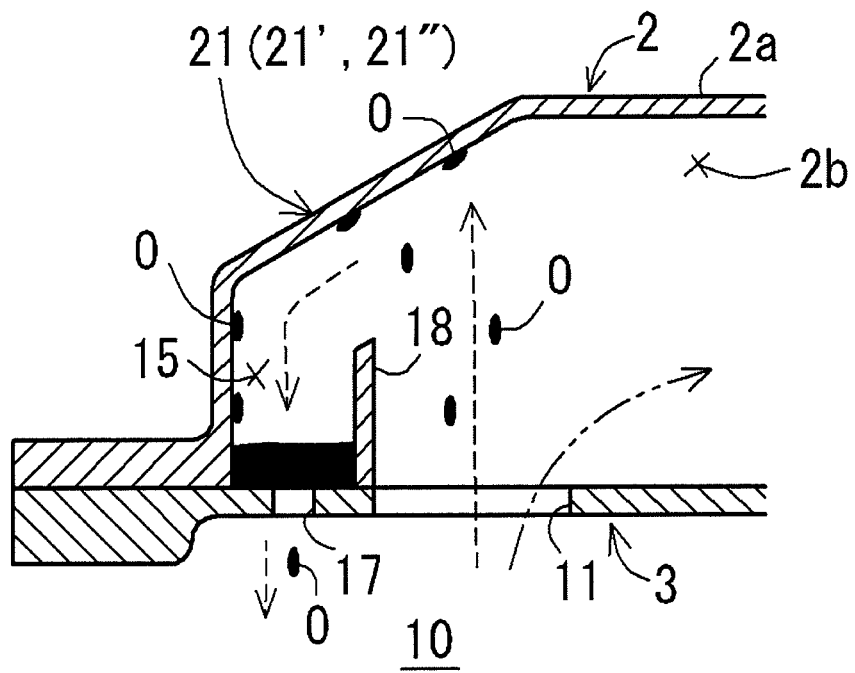

While the forms in which the second guide wall 22, 22' is provided have been exemplified in the Examples described above, the present invention is not limited thereto. For example, at least the first guide wall 21, 21', 21" may be provided without the second guide wall 22, 22', as shown in FIG. 10B.

While the flat plate-shaped first guide walls 21, 21', 21" which each incline at a uniform inclination angle toward the chamber 15 have been exemplified in the Examples described above, the present invention is not limited thereto. For example, a curved plate-shaped first guide wall which inclines at different inclination angles toward the chamber 15 may be employed. Further, while the dome roof-shaped first guide wall 21' has been exemplified in the Examples described above, the present invention is not limited thereto. For example, a gable roof-shaped first guide wall may be employed.

While the first guide walls 21, 21', 21" which each cover a major portion except a part of the gas introduction port 11 have been exemplified in the Examples described above, the present invention is not limited thereto. For example, a first guide wall which covers the whole gas introduction port 11 may be employed. Further, while the first guide walls 21, 21', 21" which each cover the whole chamber 15 have been exemplified in the Examples described above, the present invention is not limited thereto. For example, a first guide wall which covers a major portion except a part of the chamber 15 may be employed.

While the chamber 15 over the width direction of the left and right side walls 2b of the cylinder head cover 2 has been exemplified in the Examples described above, the present invention is not limited thereto. For example, a chamber having a width shorter than the interval between the left and right side walls 2b of the cylinder head cover 2 may be employed.

While the second guide wall 22 provided with the rib 25 has been exemplified in the Examples described above, the present invention is not limited thereto. For example, a second guide wall having no rib 25 may be adopted. Further, for example, the rib 25 may be provided on the outer peripheral side of the passing part 23' in the second guide wall 22'.

While the second guide walls 22, 22' and partition wall 18 formed integrally with the cylinder head cover 2 have been exemplified in the Examples described above, the present invention is not limited thereto. For example, there may be adopted a second guide wall and a partition wall which are each formed integrally with the baffle plate 3 or a second guide wall and a partition wall which are each different from the cylinder head cover 2 and the baffle plate 3.

Further, while the labyrinth type gas-liquid separation structure 5 has been exemplified in the Examples described above, the present invention is not limited thereto. For example, there may be adopted a collision type gas-liquid separation structure in which blow-by gas is jetted from a nozzle hole to be collided with a collision wall for oil separation or a centrifugation type gas-liquid separation structure, in place of or in addition to this structure.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

The present invention is widely utilized as a technique of separating and collecting an oil component contained in blow-by gas.

What is claimed is:

1. An oil mist separator comprising:
   a cylinder head cover;
   a baffle plate which closes the bottom surface side of the cylinder head cover; and
   a gas flow passage formed between the cylinder head cover and the baffle plate, the oil mist separator configured to separate oil from blow-by gas which flows from a gas introduction port formed in the baffle plate into the gas flow passage and flows through the gas flow passage, wherein a chamber is provided between the cylinder head cover and the baffle plate, the chamber being partitioned from the gas flow passage including the gas introduction port, wherein a first guide wall is provided above the gas introduction port and the chamber, the first guide wall extending with a downward inclination toward the chamber so as to cover the gas introduction port and the chamber, wherein a drain hole for discharging the oil within the chamber is formed in the baffle plate, wherein a second guide wall is provided between the first guide wall and the gas introduction port, the second guide wall extending with a downward inclination toward the chamber, wherein the second guide wall is provided with a passing part through which scattered oil flowing from the gas introduction port into the gas flow passage is passable, wherein a rib is raised along an outer peripheral side of the passing part on an upper surface of the second guide wall, and wherein the passing part is composed of an opening part.

2. The oil mist separator according to claim 1, wherein the first guide wall is composed of a part of a ceiling wall of the cylinder head cover.

3. The oil mist separator according to claim 1, wherein the passing part is composed of a mesh-like material or composed of a porous plate having a plurality of through holes formed therein.

4. The oil mist separator according to claim 1, wherein the first guide wall is defined in a dome roof.

5. The oil mist separator according to claim 1, wherein the chamber and the gas flow passage are partitioned by a partition wall raised from on the baffle plate.

6. The oil mist separator according to claim 5, wherein the partition wall is arranged along an edge side of the gas introduction port.

7. The oil mist separator according to claim 5, wherein the partition wall defines a sidewall of the chamber.

* * * * *